United States Patent
Liu et al.

(10) Patent No.: US 12,440,826 B2
(45) Date of Patent: Oct. 14, 2025

(54) NITROGEN-PHOSPHORUS-MODIFIED GRANULAR CARBON-SUPPORTED BIMETALLIC CATALYST, PREPARATION METHOD THEREFOR AND USE THEREOF

(71) Applicants: Zhejiang Lantian Environmental Protection Hi-Tech Co., Ltd., Hangzhou (CN); Zhejiang Research Institute of Chemical Industry Co., Ltd., Hangzhou (CN); Sinochem Lantian Co., Ltd., Hangzhou (CN)

(72) Inventors: Wucan Liu, Hangzhou (CN); Ling Li, Hangzhou (CN); Chaofeng Ma, Hangzhou (CN); Nengfu Shi, Hangzhou (CN); Jiamin Jin, Hangzhou (CN); Xiaonian Li, Hangzhou (CN); Chunshan Lu, Hangzhou (CN); Juanjuan Nie, Hangzhou (CN)

(73) Assignees: ZHEJIANG LANTIAN ENVIRONMENTAL PROTECTION HI-TECH CO., LTD., Hangzhou (CN); ZHEJIANG RESEARCH INSTITUTE OF CHEMICAL INDUSTRY CO., LTD., Hangzhou (CN); SINOCHEM LANTIAN CO., LTD., Hangzhou (CN)

( * ) Notice: Subject to any disclaimer, the term of this patent is extended or adjusted under 35 U.S.C. 154(b) by 764 days.

(21) Appl. No.: 17/637,922

(22) PCT Filed: Nov. 27, 2020

(86) PCT No.: PCT/CN2020/132180
§ 371 (c)(1),
(2) Date: Feb. 24, 2022

(87) PCT Pub. No.: WO2021/104437
PCT Pub. Date: Jun. 3, 2021

(65) Prior Publication Data
US 2022/0280920 A1 Sep. 8, 2022

(30) Foreign Application Priority Data

| Nov. 29, 2019 | (CN) | 201911197347.9 |
| Nov. 29, 2019 | (CN) | 201911197353.4 |
| Nov. 29, 2019 | (CN) | 201911197635.4 |

(51) Int. Cl.
| B01J 21/18 | (2006.01) |
| B01J 23/06 | (2006.01) |
| B01J 23/14 | (2006.01) |
| B01J 23/40 | (2006.01) |
| B01J 23/42 | (2006.01) |
| B01J 23/44 | (2006.01) |
| B01J 23/46 | (2006.01) |
| B01J 23/60 | (2006.01) |
| B01J 23/62 | (2006.01) |
(Continued)

(52) U.S. Cl.
CPC ............... B01J 23/40 (2013.01); B01J 23/06 (2013.01); B01J 23/14 (2013.01); B01J 23/72 (2013.01); C07C 17/23 (2013.01)

(58) Field of Classification Search
CPC ... B01J 21/18; B01J 23/06; B01J 23/14; B01J 23/40; B01J 23/42; B01J 23/44; B01J 23/462; B01J 23/60; B01J 23/622; B01J 23/72; B01J 23/80; B01J 23/855; B01J 23/8926; B01J 23/8953; B01J 23/8966; C07C 17/23
USPC ................................. 502/185, 329, 331, 339
See application file for complete search history.

(56) References Cited

U.S. PATENT DOCUMENTS

| 7,193,107 | B2 * | 3/2007 | Leiber | C07F 9/3813 562/17 |
| 7,291,751 | B2 * | 11/2007 | Leiber | B01J 23/56 562/17 |
| 9,409,162 | B2 * | 8/2016 | Bohringer | B01J 20/3204 |
| 11,077,421 | B2 * | 8/2021 | Srinivas | B01J 20/28083 |
(Continued)

FOREIGN PATENT DOCUMENTS

| CN | 1065261 A | 10/1992 |
| CN | 1351903 A | 6/2002 |
(Continued)

OTHER PUBLICATIONS

Maryam Borghei et al., "Porous N, P-doped carbon from coconut shells with high electrocatalytic activity for oxygen reduction: Alternative to Pt—C for alkaline fuel cells", Applied Catalysis B: Environmental, vol. 204, May 5, 2017, pp. 394-402.*
(Continued)

Primary Examiner — Cam N. Nguyen
(74) Attorney, Agent, or Firm — Muncy, Geissler, Olds & Lowe, P.C.

(57) ABSTRACT

Provided are a nitrogen-phosphorus-modified granular carbon-supported bimetallic catalyst, a preparation method thereof and the use thereof. The catalyst comprises a nitrogen-phosphorus-modified carbon carrier and metal particles supported on the carbon carrier. The metal particles include first metal elementary substance particles, second metal elementary substance particles and bimetallic alloy phase particles. The percentage of the bimetallic alloy phase particles in the metal particles is ≥80%, and at least 90% of the alloy phase particles have a size of 1 nm to 20 nm. The catalyst has advantages such as a high proportion of alloy phase particles, a uniform particle size distribution, a high metal utilization rate, low costs, high stability and a high catalytic activity.

17 Claims, No Drawings

(51) Int. Cl.
  *B01J 23/72* (2006.01)
  *B01J 23/80* (2006.01)
  *B01J 23/85* (2006.01)
  *B01J 23/89* (2006.01)
  *C07C 17/23* (2006.01)

(56) References Cited

U.S. PATENT DOCUMENTS

| 2004/0167366 A1 | 8/2004 | Rao et al. |
| 2010/0160696 A1 | 6/2010 | Nappa et al. |
| 2014/0275680 A1 | 9/2014 | Zhan et al. |

FOREIGN PATENT DOCUMENTS

| CN | 1460547 A | 12/2003 |
| CN | 105457651 A | 4/2016 |
| CN | 105771149 A | 7/2016 |
| CN | 107482234 A | 12/2017 |
| CN | 108283933 A | 7/2018 |
| CN | 109824473 A | 5/2019 |
| CN | 109999877 A | 7/2019 |
| CN | 110302801 A | 10/2019 |
| EP | 0747337 B1 | 12/2000 |
| WO | WO2009006358 A | 1/2009 |

OTHER PUBLICATIONS

Jinliang Zhu et al., "Direct anchoring of platinum nanoparticles on nitrogen and phosphorus-dual-doped carbon nanotube arrays for oxygen reduction reaction", Electrochimica Acta, vol. 158, Mar. 10, 2015, pp. 374-382.*

* cited by examiner

NITROGEN-PHOSPHORUS-MODIFIED GRANULAR CARBON-SUPPORTED BIMETALLIC CATALYST, PREPARATION METHOD THEREFOR AND USE THEREOF

TECHNICAL FIELD

The present invention relates to the technical field of catalysts, particularly to a nitrogen-phosphorus-modified granular carbon-supported bimetallic catalyst, preparation method thereof and an application of the granular carbon-supported bimetallic catalyst in the selective catalytic hydrodechlorination of chlorofluoro alkanes, more particularly to the preparation of chlorotrifluoroethylene from trichlorotrifluoroethane by hydrodechlorination and preparation of 1,1,1,4,4,4-hexafluoro-2-butene from 2,3-dichloro-1,1,1,4,4,4-hexafluoro-2-butene by hydrodechlorination.

BACKGROUND

A high-performance catalyst is the key to hydrodechlorination reaction. Since the last century, researches on catalysts for hydrodechlorination have been reported frequently, for example, Pd—W/ZrO$_2$, Pd—Au/AC, Pd—Mg/AC, Pd—Ir/SiO$_2$, Pt—Ir/SiO$_2$, Au—Ir/SiO$_2$, Pt—Co/SiO$_2$, Pd—Bi/SiO$_2$, Pd—Cu/AC, Pd/Al$_2$O$_3$, Pt/AC, etc. However, these catalysts generally have a low catalytic activity, a low selectivity, easy loss of metal active composition, carbon deposition and sintering of metal particles, etc., resulting in poor stability and short lifetime of catalysts, which is difficult to meet the requirements for industrial applications.

The process of catalytic hydrodechlorination mainly includes: 1) the dissociation of hydrogen molecules into adsorbed active hydrogen; 2) C—Cl activation; 3) the active hydrogen attacks the C—Cl bond to generate HCl and complete the removal of chlorine. Thus, the catalysts for hydrodechlorination need double active centers that dissociate hydrogen and activate carbon-chlorine bonds. The active center that has the catalytic activity of dissociating hydrogen is mostly precious metal. However, if there is only a precious metal active center that dissociates hydrogen, it is easy to produce the problems such as low selectivity (excessive hydrogenation), poor stability of metal particles (migration, sintering, etc. of metal particles in the corrosive atmospheres of high temperature, HCl and HF), and loss of activity, etc., and it is necessary to add an active metal additive that activates the C—Cl bonds.

Chinese patent CN 110302801 A discloses a method for preparing a nano-copper/palladium alloy catalyst. According to the method, copper nitrate ethanol solution, an organic modifier polyvinylpyrrolidone and sodium hydroxide ethanol solution are added to make colloid, then a reduction reaction is conducted with hydrazine hydrate to form a nano copper sol; sodium hydroxide ethanol solution is added to adjust to an alkaline environment, and palladium chloride ethanol solution is added; finally a reduction reaction is conducted with hydrazine hydrate, to obtain a nano-copper/palladium alloy catalyst.

Chinese patent CN107482234A discloses a method for preparing a carbon material supported palladium-copper alloy catalyst for fuel cells co-doped with sulfur, nitrogen and cobalt. According to the method, 2-amino-1,3,5-triazine-4,6-dithiol, formaldehyde and Co(CH$_3$COO)$_4$·H$_2$O react through hydrothermal synthesis, and drying and roasting are performed, to make a carbon material co-doped with sulfur, nitrogen and cobalt with a double-layer hollow shell spherical structure, then the carbon material is immersed into a solution of chloropalladic acid and copper sulfate, and hydrothermal reaction is conducted to obtain a carbon material supported palladium-copper alloy catalyst for fuel cells co-doped with sulfur, nitrogen and cobalt with a hollow shell spherical structure.

Sun Limei et al. (Effect of Cu on Pd/C Electrocatalytic Ethanol Oxidation Performance, Chinese Journal of Materials Research, 2018, 32(9), 669-674) reported preparation of Pdx-Cu/C catalysts of different Pd/Cu ratios with activated carbon (Vulcan XC-72) as a carrier by using a modified chemical reduction method. When Pd/Cu ratio is 8:1, Pd8-Cu/C catalyst particles are uniformly dispersed on the surface of the carbon carrier, and the diameter is about 2.8 nm; and a small amount of Cu element incorporated in the catalyst partially enters the Pd lattice to form an alloy. This catalyst exhibits the best catalytic activity and stability in mixed aqueous solutions, and the catalytic peak current density for the oxidation of C$_2$H$_5$OH reaches 114 mA/cm$^2$, which is 2.5 times that of Pd/C.

The bimetallic alloy catalysts disclosed in the above prior art do not consider the ratio of bimetallic alloy particles to the total metal particles. The preparation method used is difficult to achieve a controllable preparation of palladium-copper alloy particles, especially for the orderly regulation of particulate carbon-supported bimetallic alloy particles.

Carbon particles are a type of nano-scale carbon material, which has received widespread attention since its inception. Doping with heteroatoms can make carbon particles to exhibit better fluorescence and electronic properties. Therefore, heteroatom-doped carbon particles can be used in the fields of optical materials and catalytic materials, etc.

Chinese patent CN109999877A discloses a carbon-supported precious metal particle catalyst modified by nitrogen-sulfur co-doped carbon quantum dots, which is prepared by an aqueous solution of nitrogen-sulfur co-doped carbon quantum dots and an M/C catalyst. The precious metal in the catalyst obtained by the preparation method exists in the form of elementary substance and oxidation state, and the carbon quantum dots loaded afterwards interact with metal particles, so it is particularly suitable for the selective catalytic hydrogenation of organic substances without fluorine and chlorine. However, the patent only relates to the electronic effect of carbon quantum dots on a single precious metal particle, and does not consider the interactions between carbon quantum dots and multi-metal components and the catalyst preparation method in terms of active site structure and electronic properties, etc.

Chlorotrifluoroethylene (CTFE) is an important fluorine-containing polymer monomer, and catalytic hydrodechlorination is currently the most promising green synthesis route.

The patent EP416615A1 describes that Fe, Ni, Cu, Sn, Zn, Cr or their oxides serve as active components of the catalyst, silica, magnesia, alumina, zirconia, Y-type zeolite, silica-alumina, silicon carbide, diatomaceous earth, etc. serve as carriers to conduct CFC-113 hydrodechlorination catalytic reaction at a reaction temperature of 300° C. to 550° C. The impregnated catalyst precursor (active component nitrate) is pretreated at 450° C. for 2 h in an argon atmosphere. Due to the high reaction temperature, the pyrolysis reaction is prone to occur, which causes the carbon deposition on the catalyst surface and deactivation, and the catalyst lifetime is short.

The patents CN1065261A and EP0747337B1 disclose gas phase synthesis of chlorotrifluoroethylene by CFC-113 and H$_2$ under the catalysis of a bimetallic composite carbon-supported catalyst to produce trifluoroethylene or tetrafluoroethylene. The catalyst is (at least one) group VIII metal and copper, of which copper accounts for 12%-22% of the total mass of the catalyst. As the group VIII metal is used as an active component, the conversion rate of trichlorotrifluoroethane is high, but due to the high copper content, the stability of the catalyst still needs to be improved.

The Chinese patent CN1351903A discloses a four-way catalyst, which uses precious metal ruthenium (or palladium and platinum) and metal copper as the main active components, lanthanum-rich mixed rare earth (or metal lanthanum) and alkali metal lithium as a modification promoter, and coconut shell activated carbon as a carrier. The lifetime of the catalyst can reach about 600 h.

The Chinese patent CN1460547A discloses a non-precious metal catalyst, which uses metal rhenium and metal copper as main active components, metal lanthanum as a modification promoter component, and coconut shell activated carbon as a carrier. The lifetime of the catalyst is 500 h.

The Chinese patent CN105457651A discloses a method for preparing chlorotrifluoroethylene by catalytic hydrodechlorination of CFC-113. According to the method, the catalyst used is composed of a main catalyst, a promoter and a carrier. The main catalyst is Pd and Cu, and the promoter is a combination of at least one of Mg, Ca and Ba with Sm and/or Ce. Although this method has a high selectivity and a long catalyst lifetime, the catalyst is composed of four metal components, and the cost for the catalyst preparation and precious metal recovery is high.

1,1,1,4,4,4-hexafluoro-2-butene is a refrigerant substitute with good application prospects and broad market prospects. The synthesis route of gas-phase catalytic hydrodechlorination of 2,3-dichloro-1,1,1,4,4,4-hexafluoro-2-butene is short and has the most industrial application value. However, there are few researches at present, with the main problems of low catalyst activity, low target product selectivity, or high reaction temperature and unclear catalyst stability, etc., thereby limiting the further industrial application of this process.

The patent WO2009006358A published by U.S. Namur DuPont reports a method for preparing HFC-1336 by CFC-1316 hydrodechlorination. According to the method, the catalyst is copper metal deposited on a carrier and contains lead-poisoned palladium deposited on calcium fluoride. Under the catalysis of 1% Cu-1% Ni/C, the reaction temperature is 375° C., the ratio of n(H$_2$)/n(R1316) is 7.5:1, the contact time is 30s, the corresponding conversion rate of CFC-1316 is 100%, the selectivity of HFO-1336 is 82%, and the remaining by-product is HCFC-1326. The stability of the catalyst is not mentioned.

Subsequently, in 2010, DuPont's patent US20100160696A discloses a non-precious metal catalyst containing chromium, nickel and potassium or cesium. Under the action of a commercial K—Cr—Ni (K ratio of 20%) catalyst, the reaction temperature is 399° C., the ratio of N(H$_2$)/n(R1316) is 3.9:1, when the contact time is 20s, the corresponding conversion rate of CFC-1316 is 40%, the selectivity of HFO-1336 is 77%, and the remaining by-products are HCFC-1326 and hexafluoro-2-butyne. The stability of the catalyst is not mentioned.

Stepanov et al. (Russian Journal of Organic Chemistry, 2010, Vol. 46, No. 9, pp. 1290-1295) proposed that Ni—Cr catalyst can convert chlorofluoro alkanes into fluorine-containing olefins. When the reaction temperature is 200° C., the conversion rate of CFC-1316 is 20%, and the selectivity of HFO-1336 and HCFC-1326 is 50% each; when the reaction temperature is 240° C., the conversion rate of CFC-1316 is 75%, and the selectivity of HFO-1336 is increased to 65%. Other products are HCFC-1326 and HCFC-356.

As is well-known, the catalyst active components, the surface properties of the catalyst carrier, the modification of the promoter and the preparation methods and conditions of the catalyst are key factors affecting the performance of the catalyst. How the precious metal active metal and the second promoter metal form a specific structure morphology and electron characteristics and selectively adsorb and activate hydrogen and chlorine-containing organics, how to match the process of dissociating hydrogen and activating C—Cl bonds, and generating the target fluorine compound with high selectivity, are still one of the current challenges in the development of catalytic hydrodechlorination catalysts.

SUMMARY

In order to solve the above technical problems, the present invention provides a nitrogen-phosphorus-modified granular carbon-supported bimetallic catalyst that has a high proportion of alloy phase particles, high stability and long lifetime. When the nitrogen-phosphorus-modified granular carbon-supported bimetallic catalyst is used in the hydrodechlorination of chlorofluoro alkanes, it has advantages such as a high raw material conversion rate and high product selectivity.

To achieve the object, the present invention adopts the following technical solutions:

A nitrogen-phosphorus-modified granular carbon-supported bimetallic catalyst, wherein the catalyst comprises a nitrogen-phosphorus-modified carbon carrier and metal particles supported on the carbon carrier, and the metal particles include first metal elementary substance particles, second metal elementary substance particles and bimetallic alloy phase particles, the percentage of the bimetallic alloy phase particles in the metal particles is ≥80%, and at least 90% of the alloy phase particles have a size of 1 nm to 20 nm. Preferably, the percentage of the bimetallic alloy phase particles in the metal particles is 85-95%, and at least 95% of the alloy phase particles have a size of 2 nm to 10 nm.

The doping of nitrogen and phosphorus heteroatoms can promote the dispersion of metal particles and the controllable synthesis of bimetallic alloy phase particles. Nitrogen, phosphorus, alloy phase metal particles and the carbon carrier microdomains that interact with them constitute a catalytic activity center. The interaction coupling of the lone pair of electrons in the outer layer of nitrogen and phosphorus heteroatoms shows suitable electron donating properties for bimetallic alloy phase particles, promotes and strengthens the bifunctional active center of hydrogen dissociation and C—Cl bond activation of bimetallic alloy phase particles, which not only effectively avoids excessive hydrogenation and carbon deposition, but also realizes the coordination and efficient activation of hydrogen and C—Cl bonds, and achieves the an efficient and stable synthesis of chlorofluoro alkanes through catalytic hydrodehalogenation reaction.

According to the foregoing granular carbon-supported bimetallic catalyst, optionally, the nitrogen content in the carbon carrier is 0.5-10 wt %, and the phosphorus content in the carbon carrier is 0.1-5.0 wt %. Preferably, the nitrogen content in the carbon carrier is 1.0-8.0%, and the phosphorus content in the carbon carrier is 0.5-4.0%.

According to the foregoing granular carbon-supported bimetallic catalyst, optionally, the carbon carrier is selected from coconut shell or wooden activated carbon, the specific surface area of the carbon carrier is ≥800 m²/g, the metal ash content is ≤3.0 wt %, the mesopore ratio is ≥50%, and the micropore ratio is ≤50%. Preferably, the specific surface area of the carbon carrier is 900-2,000 m²/g, the metal ash content is ≤2.5 wt %, the mesopore ratio is ≥70%, and the micropore ratio is ≤30%. More preferably, the specific surface area of the carbon carrier is 1,000-1,500 m²/g, the metal ash content is ≤2.5 wt %, the mesopore ratio is ≥80%, and the micropore ratio is ≤20%.

The shape and size of the carbon carrier have a greater impact on the desorption of intermediate species in the hydrodechlorination reaction. Therefore, the carbon carrier of the present invention is a cylindrical particle with a particle diameter of 0.1-0.5 cm and a length of 0.1-5 cm. Preferably, the particle diameter of the carbon carrier is 0.2-0.4 cm, and the particle length is 0.1-3 cm; the above particle size facilitates the desorption of intermediate species during the reaction of chlorofluoro alkanes in a fixed bed, reduces carbon deposition, and increases the lifetime of the catalyst.

According to the foregoing granular carbon-supported bimetallic catalyst, optionally, a first metal is selected from at least one of palladium, platinum or ruthenium, with a loading content of 0.01-4.0%; a second metal is selected from copper, zinc and/or tin, with a loading content of 0.01-10.0%; and the mass ratio of the first metal to the second metal is (0.01-5):1. Preferably, the loading content of the first metal is 0.1-3.0%, the loading content of the second metal is 0.1-7.5%, and the mass ratio of the first metal to the second metal is (0.05-4):1.

The present invention also provides a method for preparing the granular carbon-supported bimetallic catalyst as described above, wherein the granular carbon-supported bimetallic catalyst is prepared by the following steps:

A1. preparing nitrogen-phosphorus co-doped carbon particles;

A2. loading the nitrogen-phosphorus co-doped carbon particles onto the carbon carrier; the nitrogen-phosphorus co-doped carbon particles are uniformly distributed on the carbon carrier, and the size distribution is uniform within 20 nm; preferably, the carbon particles have a size of 1.1-15 nm; specifically, the carbon particles having a size of 1.1-15 nm account for more than 80%, and the carbon particles having a size of less than 1.1 nm account for less than 5%, and the carbon particles having a size of 15-20 nm account for 15%;

A3. loading the second metal onto the carbon carrier by using nitrogen-phosphorus co-doped carbon particles as a first anchor point under the irradiation with an ultraviolet lamp;

A4. loading the first metal on the carbon carrier.

In order to promote the directional deposition of the second metal and the interaction between the nitrogen and phosphorus elements and the second metal, an ultraviolet lamp is used for irradiation. Specifically, a 200-500 w ultraviolet lamp is used to irradiate once to three times, 2-10 minutes each time; preferably, an ultraviolet lamp with a wavelength of 280-320 nm and 200-280 nm is used to irradiate twice respectively, 2-8 minutes each time.

In order to achieve the directional deposition of the first metal, preferably, the step A3 further comprises:

pyrolyzing carbon particles at a temperature of 120-300° C. in a hydrogen atmosphere after the second metal is loaded onto the carbon carrier, after pyrolysis of carbon particles, the binding sites of nitrogen and phosphorus elements, the carbon carrier and the second metal form a second anchor point for loading the first metal onto the carbon carrier.

The method for preparing the granular carbon-supported bimetallic catalyst specifically comprises the following steps:

S1. preparing nitrogen-phosphorus co-doped carbon particles:

Taking citric acid, deionized water or organic solvents and nitrogen and phosphorus-containing substances according to a mass ratio of (1-4):(8-20):(1-8) and putting them into a hydrothermal reactor, conducting hydrothermal reaction in the hydrothermal reactor at 150-200° C. for 7-14 h, taking out the samples that are subjected to hydrothermal reaction, removing large particles, and dialyzing the supernatant with a dialysis bag with a molecular weight cut-off of 1,000-500 KD until there is no obvious color outside of the bag; collecting the solution in the middle of the two dialysis bags, concentrating at a low temperature (not higher than 20° C.) under a shading condition, to obtain an aqueous solution of nitrogen-phosphorus co-doped carbon particles, controlling the aqueous solution of nitrogen-phosphorus co-doped carbon particles to be 10-40 wt %; the nitrogen-phosphorus co-doped carbon particles emit fluorescence under 365 nm ultraviolet light;

The nitrogen and phosphorus-containing substances are a mixture of phosphorus-containing compounds and nitrogen-containing compounds or nitrogen and phosphorus-containing compounds. The mass ratio of the phosphorus-containing compounds to nitrogen-containing compounds is not higher than 3:1. The phosphorus-containing compounds are organic phosphines and are selected from at least one of triphenylphosphorus, phenylphosphonic acid, methylphosphonic acid, and O,O-diethyl phosphite; the nitrogen-containing compounds are at least one of ammonia, ethylenediamine, glutamic acid, serine, glycine, alanine, lysine, aspartic acid, and leucine; the nitrogen and phosphorus-containing compounds are organic substances containing both nitrogen and phosphorus and are selected from at least one of triphenylammonium phosphate, phosphoramine, hexaphosphoramine, and tetraphenylphosphine imide, and when nitrogen and phosphorus-containing compounds are used, citric acid may not be added in the hydrothermal reaction process.

S2. loading the nitrogen-phosphorus co-doped carbon particles:

Pouring the granular carbon into a carbon particle solution after washed until there is no dust, soaking 2-8 hours at a temperature of 10-30° C., then rinsing with deionized water for three times, filtering and sealing to preserve under a vacuum condition, to obtain a nitrogen-phosphorus co-doped carbon carrier;

The above aqueous solution of nitrogen-phosphorus co-doped carbon particle can be directly used as the carbon particle solution, or the aqueous solution of nitrogen-phosphorus co-doped carbon particle can be prepared as an impregnating solution. The preparation requirements: the mass ratio of carbon particles to granular carbon is 1:(1-8), and the ratio of the total volume of the impregnating solution to the volume of the granular carbon is (1-4):1.

S3. loading the second metal:

Preparing a second metal impregnating solution according to the loading content, pouring the nitrogen-phosphorus co-doped carbon carrier obtained in the step S2 into the second metal impregnating solution, heating to increase the temperature from 10-25° C. to 85-95° C. at a heating rate of 0.5-4° C./min, keeping at 85-95° C. for 2-6 hours; irradiating with 200-500W UV lamp once to three times during the heating period, 2-8 minutes each time; filtering and washing, performing treatment at the constant temperature of 120-280° C. in the hydrogen atmosphere for 3-6 hours, pyrolyzing carbon particles, then preserving the second metal-supported carbon carrier in an inert atmosphere;

The volume ratio of the second metal impregnating solution to the nitrogen-phosphorus co-doped carbon carrier obtained in the step S2 is (1-4):1;

The second metal is a nitrate or halide of the second metal, preferably a chloride;

S4. loading the first metal:

Preparing the first metal impregnating solution according to the loading content, pouring the second metal-supported carbon carrier obtained in the step S3 into the first metal impregnating solution, soaking 2-4 hours at 25-85° C., filtering and washing, to obtain a nitrogen-phosphorus-modified granular carbon-supported bimetallic catalyst.

The ratio of the total volume of the first metal impregnating solution to the volume of the second metal-supported carbon carrier obtained in the step S3 is (2-5):1;

The first metal impregnating solution is a nitrate or chloride of the first metal, preferably a complex formed by a chloride ion and a precious metal, for example, $[PdCl_4]^{2-}$, $[PtCl_4]^{2-}$, $[RuCl_4]^{2-}$.

The present invention also provides an application of any one of the foregoing granular carbon-supported bimetallic catalysts. The granular carbon-supported bimetallic catalyst of the present invention is particularly suitable for the hydrodechlorination of C1-C5 chlorofluoro alkanes in a fixed bed. After applying the granular carbon-supported bimetallic catalyst of the present invention, the conversion rate of C1-C5 chlorofluoro alkanes is at least about 98%, and the product selectivity is at least about 95%. The granular carbon-supported bimetallic catalyst is especially suitable for preparing difluoromethane from difluorodichloromethane, preparing chlorotrifluoroethylene from trichlorotrifluoroethane, preparing 1,1,1,4,4,4-hexafluoro-2-butene from 2,3-dichloro-1,1,1,4,4,4-hexafluoro-2-butene, preparing pentafluoroethane from chloropentafluoroethane or preparing trichloromethane from carbon tetrachloride.

The present invention also provides a method for preparing chlorotrifluoroethylene. According to the method, trifluorotrichloroethane is used as a raw material, and the reaction is carried out in the presence of the granular carbon-supported bimetallic catalyst described above, the conversion rate of trichlorotrifluoroethane is at least about 98%, the selectivity of chlorotrifluoroethylene is at least about 95%, and the product contains at least less than about 1% of chlorotrifluoroethane.

B1. feeding the granular carbon-supported bimetallic catalyst into a fixed-bed reactor, introducing a mixture of ammonia and chlorofluoroethane, wherein the molar ratio of ammonia to chlorofluoroethane is (50-100):1, the air speed is 10,000-50,000 heating to 300-400° C. at a rate of 0.5-3.5° C./min, keeping 1-5 hours and then cooling to the reaction temperature;

The ammonia can also be hydrogen or a mixture of ammonia and hydrogen in any ratio, and the chlorofluoroethane can be one of dichlorodifluoroethane, trichlorotrifluoroethane, dichlorotrifluoroethane, chlorotrifluoroethane or a mixture thereof in any ratio;

B2. introducing a mixture composed of hydrogen and trichlorotrifluoroethane, wherein the molar ratio of $H_2$ to trichlorotrifluoroethane is (1.5-4.0):1, the air speed is 120-500 $h^{-1}$ and the reaction temperature is 150-300° C.

Preferably, in the preparation process of the granular carbon-supported bimetallic catalyst for preparing chlorotrifluoroethylene, carbon particles with a size of ≤10 nm are selected; more preferably, carbon particles with a size of 3.5-8.5 nm are selected; specifically, carbon particles with a size of 3.5-8.5 nm account for more than 80%, carbon particles with a size of less than 3.5 nm account for less than 15%, and carbon particles with a size of 8.5-10 nm account for less than 5%.

Preferably, the size of the inner diameter of the reactor is 10-20 times the size of the catalyst particles.

The present invention also provides a method for preparing 1,1,1,4,4,4-hexafluoro-2-butene. According to the method, 2,3-dichloro-1,1,1,4,4,4-hexafluoro-2-butene is used as a raw material, and the reaction is carried out in the presence of the granular carbon-supported bimetallic catalyst as described above, the conversion rate of 2,3-dichloro-1,1,1,4,4,4-hexafluoro-2-butene is at least about 98%, and the selectivity of 1,1,1,4,4,4-hexafluoro-2-butene is at least about 95%, and the product contains at least less than about 1% of 2-chloro-1,1,1,4,4,4-hexafluoro-2-butene.

The method for preparing 1,1,1,4,4,4-hexafluoro-2-butene specifically comprises the following steps:

C1. feeding the granular carbon-supported bimetallic catalyst into a fixed-bed reactor, introducing a mixture of hydrogen and dichlorodifluoroethane, wherein the molar ratio of $H_2$ to dichlorodifluoroethane is (50-100):1, the air speed is 10,000-50,000 $h^{-1}$, heating to 300-400° C. at a rate of 0.5-3.5° C./min, keeping 1-5 hours and then cooling to the reaction temperature;

C2. introducing a mixture composed of hydrogen and 2,3-dichloro-1,1,1,4,4,4-hexafluoro-2-butene, wherein the molar ratio of $H_2$ to 2,3-dichloro-1,1,1,4,4,4-hexafluoro-2-butene is (1.5-4.0):1, the air speed is 120-600 $h^{-1}$ and the reaction temperature is 150-350° C.

Preferably, in the preparation process of the granular carbon-supported bimetallic catalyst for preparing 1,1,1,4,4,4-hexafluoro-2-butene, carbon particles with a size of ≤15 nm are selected; more preferably, carbon particles with a size of 8.5-12.5 nm are selected; specifically, carbon particles with a size of 8.5-12.5 nm account for more than 80%, carbon particles with a size of less than 8.5 nm account for less than 5%, and carbon particles with a size of 12.5-15 nm account for less than 15%.

Preferably, the size of the inner diameter of the reactor is 10-20 times the size of the catalyst particles.

Compared with the prior art, the present invention has the following beneficial effects:

1. The present invention adopts carbon particles with abundant surface groups as the "carrier" of nitrogen and phosphorus, which is environmentally friendly and pollution-free.

2. The carbon particles of the present invention are introduced and then pyrolyzed, and the introduced nitrogen-phosphorus co-doped carbon particles are loaded onto the surface of the carbon carrier. The carbon particles as the first anchor point induce the directional deposition and uniform distribution of the second metal. The pyrolyzed carbon particles make the nitrogen and phosphorus elements, the carbon carrier and the second metal to stably combine and form a second anchor point, which promotes the corresponding combination of the first metal particle and the second metal, reduces the isolated second metal particle and the first metal particle, and greatly improves the proportion of alloy phase particles up to 95%. An ideal active structure of chlorofluoro alkanes for selective catalytic hydrogenation and dehydrochlorination reaction is obtained, the stability of active sites of catalyst is enhanced, the metal utilization rate is increased and the cost of catalysts is reduced remarkably.

3. An ultraviolet lamp is used for irradiation during the process of loading the second metal, which promotes the directional deposition of the second metal, strengthens the binding stability of nitrogen and phosphorus elements and the second metal, facilitates the formation of bimetallic alloy phase particles in the later stage.

4. The catalyst of the present invention is applied to the catalytic hydrogenation and dehydrochlorination reaction, which can improve the conversion rate of raw materials and the product selectivity, has a high catalytic efficiency, good catalyst stability and a long lifetime.

DETAILED DESCRIPTION

The present invention will be further described below in conjunction with specific embodiments, but the present invention is not limited to these specific embodiments. Those skilled in the art should be convinced that all possible alternatives, improvements and equivalents of the present invention should be covered in the scope of protection as claimed in the appended claims of the present invention.

In the embodiments of the present invention, the nitrogen-containing compound is glutamic acid, the phosphorus-containing compound is phenylphosphonic acid, and the nitrogen and phosphorus-containing compound is triphenylphosphine ammonium.

Example 1

Preparation of nitrogen-phosphorus co-doped carbon particles: citric acid, deionized water and nitrogen and a phosphorus-containing substance (a mixture of phenylphosphonic acid and glutamic acid in a molar ratio of 1:2) were taken according to a mass ratio of 4:15:5, and placed into a hydrothermal reactor, a hydrothermal reaction was conducted in the hydrothermal reactor at 185-190° C. for 10 h. The samples that were subjected to hydrothermal reaction were taken out, centrifuged to remove large particles, the supernatant was dialyzed with a dialysis bag with a molecular weight cut-off of 1,000-25,000 until there was no obvious color outside of the bag; the solution in the middle of the two dialysis bags was collected, concentrated at 5-10° C. under a shading condition, to obtain an aqueous solution of nitrogen-phosphorus co-doped carbon particles, and the concentration of the aqueous solution was controlled to be 35 wt %;

Preparation of nitrogen-phosphorus co-doped carbon carrier: the granular carbon was poured into a carbon particle solution after washed until there was no dust, soaked 6 hours at a temperature of 18-20° C., then rinsed with deionized water for three times, filtered and sealed to preserve under a vacuum condition, to obtain a nitrogen-phosphorus co-doped carbon carrier. The mass ratio of carbon particles to granular carbon was 1:3.5, and the ratio of the total volume of impregnating solution to the volume of the granular carbon was 3.5:1. The diameter of the granular carbon was 0.2 cm, the length was 2 cm, the specific surface area was 950 m$^2$/g, the ash content was 2.2 wt %, the mesopore ratio was 89%;

Loading the second metal: The copper chloride impregnating solution was prepared according to 2.5 wt % loading content (the volume ratio of copper chloride impregnating solution to nitrogen-phosphorus co-doped carbon carrier was 3.5:1), and the above obtained nitrogen-phosphorus co-doped carbon carrier was quickly poured into the copper chloride impregnating solution, heated from 15° C. to 90° C. at a rate of 2° C./min, kept at a constant temperature for 3 hours, during which a 300 w UV lamp was used for irradiation twice, 3 minutes each time at the wavelengths of 280 nm and 300 nm respectively; filtered and washed, and thermostatically treated at 200° C. for 6 hours in a hydrogen atmosphere, then sealed under nitrogen protection;

Loading the first metal: chloropalladic acid impregnating solution was prepared according to 1.5 wt % loading content (the ratio of the total volume of the chloropalladic acid impregnating solution to the volume of the second metal-supported carbon carrier obtained above was 4:1), then the second metal-supported carbon carrier was quickly poured into the chloropalladic acid impregnating solution, soaked at 30° C. for 2 hours, filtered and washed to obtain a itrogen-phosphorus-modified granular carbon-supported bimetallic catalyst, as Catalyst 1. The proportion of the alloy phase particles of the Catalyst 1 was 95%, the particle size was 5 nm, the nitrogen content was 5.68 wt %, and the phosphorus content was 3.78 wt %.

Example 2

The steps for preparing the catalyst in this example were the same as those in Example 1, with the exception that the copper chloride impregnating solution was prepared according to 2.5 wt % loading content for loading the second metal, and the chloroplatinic acid impregnating solution was prepared according to 0.5 wt % loading content for loading the first metal. The prepared catalyst was denoted as Catalyst 2. The proportion of the alloy phase particles of the Catalyst 2 was 92%, the particle size was 10 nm, the nitrogen content was 6.18 wt %, and the phosphorus content was 3.48 wt %.

Example 3

The steps for preparing the catalyst in this example were the same as those in Example 1, with the exception that the stannic chloride impregnating solution was prepared according to 1.5 wt % loading content for loading the second metal, and the chloroplatinic acid impregnating solution was prepared according to 1.0 wt % loading content for loading the first metal. The prepared catalyst was denoted as Catalyst 3. The proportion of the alloy phase particles of the Catalyst 3 was 89%, the particle size was 5 nm, the nitrogen content was 3.78 wt %, and the phosphorus content was 2.28 wt %.

Example 4

The steps for preparing the catalyst in this example were the same as those in Example 1, with the exception that the zinc chloride impregnating solution was prepared according to 1.0 wt % loading content for loading the second metal, and the chloroplatinic platinum impregnating solution was prepared according to 0.5 wt % loading content for loading the first metal. The prepared catalyst was denoted as Catalyst 4. The proportion of the alloy phase particles of the Catalyst 4 was 93%, the particle size was 6 nm, the nitrogen content was 4.78 wt %, and the phosphorus content was 3.26 wt %.

Example 5

The steps for preparing the catalyst in this example were the same as those in Example 1, with the exception that a 250 w UV lamp was used for irradiation twice during the process of loading the second metal, 3 minutes each time at the wavelengths of 260 nm and 310 nm respectively. The prepared catalyst was denoted as Catalyst 5. The proportion of the alloy phase particles of the Catalyst 5 was 93%, the particle size was 5 nm, the nitrogen content was 2.78 wt %, and the phosphorus content was 2.28 wt %.

Example 6

The steps for preparing the catalyst in this example were the same as those in Example 1, with the exception that thermostatically treated at 280° C. for 4 hours in a hydrogen atmosphere during the process of loading the second metal. The prepared catalyst was denoted as Catalyst 6. The proportion of the alloy phase particles of the Catalyst 6 was 95%, the particle size was 8 nm, the nitrogen content was 3.98 wt %, and the phosphorus content was 1.28 wt %.

Example 7

The steps for preparing the catalyst in this example were the same as those in Example 1, with the exception that deionized water and triphenylphosphine ammonium were taken at a mass ratio of 10:5 for hydrothermal reaction in the process of preparing nitrogen-phosphorus co-doped carbon particles. The prepared catalyst was denoted as Catalyst 7. The proportion of the alloy phase particles of the Catalyst 7 was 91%, the particle size was 7 nm, the nitrogen content was 3.88 wt %, and the phosphorus content was 3.58 wt %.

Example 8

The steps for preparing the catalyst in this example were the same as those in Example 1, with the exception that in preparing the nitrogen-phosphorus co-doped carbon carrier, the diameter of the granular carbon was 0.2 cm, the length was 0.5 cm, the specific surface area was 1,200 $m^2/g$, the ash content was 2.0 wt %, the mesopore ratio was 80%. The prepared catalyst was denoted as Catalyst 4. The proportion of the alloy phase particles of the Catalyst 4 was 95%, the particle size was 8 nm, the nitrogen content was 4.68 wt %, and the phosphorus content was 3.08 wt %.

Example 9

The steps for preparing the catalyst in this example were the same as those in Example 1, with the exception that the supernatant was dialyzed with a dialysis bag with a molecular weight cut-off of 25 KD-50 KD during the process of carbon particle synthesis. The prepared catalyst was denoted as Catalyst 9. The proportion of the alloy phase particles of the Catalyst 9 was 85%, the particle size was 8 nm, the nitrogen content was 3.58 wt %, and the phosphorus content was 2.98 wt %.

Example 10

The steps for preparing the catalyst in this example were the same as those in Example 1, with the exception that the second metal-supported carbon carrier was poured into the first metal impregnating solution, soaked 2 hours at 65° C. The prepared catalyst was denoted as Catalyst 10. The proportion of the alloy phase particles of the Catalyst 10 was 85%, the particle size was 12 nm, the nitrogen content was 7.78 wt %, and the phosphorus content was 3.38 wt %.

Example 11

The steps for preparing the catalyst in this example were the same as those in Example 1, with the exception that the temperature was heated from 10° C. to 95° C. at a heating rate of 1.0° C./min in the second metal impregnation process, kept at a constant temperature for 6 hours. The prepared catalyst was denoted as Catalyst 11. The proportion of the alloy phase particles of the Catalyst 11 was 88%, the particle size was 6 nm, the nitrogen content was 6.18 wt %, and the phosphorus content was 3.78 wt %.

Comparative Example 1

The steps for preparing the catalyst in this comparative example were the same as those in Example 1, with the exception that the copper chloride impregnating solution was prepared according to 15 wt % loading content for loading the second metal, and the chloroplatinic acid impregnating solution was prepared according to 5.5 wt % loading content for loading the first metal. The prepared catalyst was denoted as Catalyst B 1. The proportion of the alloy phase particles of the Catalyst B1 was 50%, the particle size was 28 nm, the nitrogen content was 5.28 wt %, and the phosphorus content was 2.28 wt %.

Comparative Example 2

The steps for preparing the catalyst in this comparative example were the same as those in Example 1, with the exception that in preparing the nitrogen-phosphorus co-doped carbon carrier, the diameter of the granular carbon was 1.0 cm, the length was 8 cm, the specific surface area was 900 $m^2/g$, the ash content was 4.5 wt %, the mesopore ratio was 30%. The prepared catalyst was denoted as Catalyst B2. The proportion of the alloy phase particles of the Catalyst B2 was 55%, the particle size was 18 nm, the nitrogen content was 4.79 wt %, and the phosphorus content was 2.38 wt %.

Comparative Example 3

The steps for preparing the catalyst in this comparative example were the same as those in Example 1, with the exception that no irradiation was carried out with an UV lamp during the process of loading the second metal. The prepared catalyst was denoted as Catalyst B3. The proportion of the alloy phase particles of the Catalyst B3 was 40%, the particle size was 10 nm, the nitrogen content was 7.75 wt %, and the phosphorus content was 4.21 wt %.

Comparative Example 4

The steps for preparing the catalyst in this comparative example were the same as those in Example 1, with the exception that during the process of loading the second metal, a 300 w UV lamp was used for irradiation 5 times, 12 minutes each time at a wavelength of 220 nm. The prepared catalyst was denoted as Catalyst B4. The proportion of the alloy phase particles of the Catalyst B4 was 70%, the particle size was 30 nm, the nitrogen content was 6.08 wt %, and the phosphorus content was 3.88 wt %.

Comparative Example 5

The steps for preparing the catalyst in this comparative example were the same as those in Example 1, with the exception that during the process of loading the second metal, the carbon particles were not pyrolyzed. The prepared catalyst was denoted as Catalyst B5. The proportion of the alloy phase particles of the Catalyst B5 was 55%, the particle size was 12 nm, the nitrogen content was 10.88 wt %, and the phosphorus content was 4.98 wt %.

Comparative Example 6

The steps for preparing the catalyst in this comparative example were the same as those in Example 1, with the exception that in the process of preparing carbon particles, phosphorus was not doped, and citric acid, deionized water and a nitrogen-containing substance (a mixture of glutamic acid) were hydrothermally reacted at a mass ratio of 4:10:5. The prepared catalyst was denoted as Catalyst B6. The proportion of the alloy phase particles of the Catalyst B6 was 65%, the particle size was 10 nm, and the nitrogen content was 4.78 wt %.

Comparative Example 7

The steps for preparing the catalyst in this comparative example were the same as those in Example 1, with the exception that in the process of preparing carbon particles, nitrogen was not doped, and citric acid, deionized water and a phosphorus-containing substance (phenylphosphonic acid) were hydrothermally reacted at a mass ratio of 4:12:3. The prepared catalyst was denoted as Catalyst B7. The proportion of the alloy phase particles of the Catalyst B7 was 60%, the particle size was 12 nm, and the nitrogen content was 3.28 wt %.

Comparative Example 8

The steps for preparing the catalyst in this comparative example were the same as those in Example 1, with the exception that in the process of preparing carbon particles, the carbon particles were not doped with heteroatoms. The prepared catalyst was denoted as Catalyst B8. The proportion of the alloy phase particles of the Catalyst B8 was 35% and the particle size was 11 nm.

Comparative Example 9

The steps for preparing the catalyst in this comparative example were the same as those in Example 1, with the exception that in the process of preparing carbon particles, nitrogen and sulfur were doped, and citric acid, deionized water and a nitrogen and sulfur-containing substance (cysteine) (containing both nitrogen and sulfur) were hydrothermally reacted at a mass ratio of 4:10:6. The prepared catalyst was denoted as Catalyst B9. The proportion of the alloy phase particles of the Catalyst B9 was 75%, the particle size was 10 nm, the nitrogen content was 8.79 wt %, and the sulfur content was 3.78 wt %.

Comparative Example 10

The steps for preparing the catalyst in this comparative example were the same as those in Example 1, with the exception that in the process of preparing carbon particles, sulfur and phosphorus were doped, and citric acid, deionized water and a sulfur and phosphorus-containing substance (diphenylsulfone and phenylphosphonic acid in a molar ratio of 1:2) were hydrothermally reacted at a mass ratio of 4:14:6. The prepared catalyst was denoted as Catalyst B10.

The proportion of the alloy phase particles of the Catalyst B10 was 60%, the particle size was 10 nm, the sulfur content was 6.18 wt %, and the phosphorus content was 3.98 wt %.

Comparative Example 11

The catalyst preparation process in the Chinese patent CN109999877A in the Background Art of the present invention was adopted, namely, an aqueous solution of carbon particle was prepared, an M/C catalyst (M as the second metal) was prepared, then the first metal component was impregnated according to the method of Example 1, to prepare the catalyst. The obtained catalyst was denoted as Catalyst B11. The proportion of the alloy phase particles of the Catalyst B11 was 65%, the particle size was 12 nm, the nitrogen content was 4.78 wt %, and the phosphorus content was 3.58 wt %.

Comparative Example 12

The steps for preparing the catalyst in this comparative example were the same as those in Example 1, with the exception that in the process of carbon particle synthesis, the supernatant was dialyzed with a dialysis bag with a molecular weight cut-off of 600 KD and the solution in the bag was collected. The prepared catalyst was denoted as Catalyst B12. The proportion of the alloy phase particles of the Catalyst B12 was 45%, the particle size was 25 nm, the nitrogen content was 4.68 wt %, and the phosphorus content was 2.98 wt %.

Example 12

This example was an application of the nitrogen-phosphorus-modified granular carbon-supported bimetallic catalyst in the preparation of chlorotrifluoroethylene by the catalytic hydrogenation and dehydrochlorination of trichlorotrifluoroethane.

5 g Catalyst 1 (diameter of 0.1 cm, length of 0.4 cm) was fed into a fixed bed reactor with an inner diameter of 100 mm. Then, the temperature was increased from room temperature to 300° C. at a heating rate of 0.5° C./min, and the temperature was kept constant for 5 hours. The gas was a mixture of ammonia/hydrogen and chlorofluoroethane (for example, dichlorodifluoroethane, trichlorotrifluoroethane) with a molar ratio of 100:1, and air speed of 25000 $h^{-1}$. Finally, the temperature was cooled to 220° C. A mixture of hydrogen and trichlorotrifluoroethane with a molar ratio of 1.5:1 was introduced, the air speed was 280 $h^{-1}$, and the reaction temperature was 220° C. The hydrogenated product was subjected to gas chromatography by Agilent 7890A GC system, the results showed that the conversion rate was 100% and the selectivity of chlorotrifluoroethylene was 98.74%.

The catalysts of Examples 2 to 11 and Comparative Examples 1 to 12 were respectively used for preparing chlorotrifluoroethylene from trichlorotrifluoroethane. The pretreatment conditions and reaction conditions of the catalyst were adjusted, and the influence of catalysts with different proportions of alloy phase particles on the reaction conversion rate and selectivity was investigated. Details were shown in Table 1 below.

TABLE 1

Results of catalyzing trichlorotrifluoroethane reaction

| Catalyst | Pretreatment conditions of catalyst Heating rate ° C./min; final temperature ° C.; time of constant temperature h; molar ratio of hydrogen/ammonia to chlorofluoroethane; air speed h$^{-1}$ | Reaction conditions | | | Conversion rate % | Selectivity % |
|---|---|---|---|---|---|---|
| | | Molar ratio of hydrogen to trichlorotrifluoroethane | Temperature ° C. | air speed h$^{-1}$ | | |
| Catalyst 1 | 0.5, 300, 5, 100:1, 30000 | 1.5:1 | 220 | 250 | 100 | 98.74 |
| Catalyst 2 | 1, 250, 1, 50:1, 20000 | 3:1 | 200 | 160 | 100 | 98.34 |
| Catalyst 3 | 3, 300, 4, 80:1, 40000 | 3:1 | 200 | 360 | 100 | 98.67 |
| Catalyst 4 | 2, 280, 3, 65(NH$_3$):1, 30000 | 3:1 | 250 | 120 | 100 | 97.89 |
| Catalyst 5 | 1, 260, 2, 66:1, 20000 | 2:1 | 300 | 180 | 100 | 97.65 |
| Catalyst 6 | 2, 270, 4, 68(NH$_3$):1, 30000 | 2:1 | 280 | 260 | 100 | 98.11 |
| Catalyst 7 | 3, 256, 3, 75:1, 40000 | 1.5:1 | 300 | 500 | 100 | 97.89 |
| Catalyst 8 | 2, 280, 3, 65:1(trichlorotrifluoroethane), 30000 | 1.5:1 | 200 | 400 | 100 | 97.35 |
| Catalyst 9 | 1, 260, 2, 66(NH$_3$):1, 20000 | 2.5:1 | 200 | 160 | 100 | 97.67 |
| Catalyst 10 | 1, 260, 2, 66:1, 20000 | 1.8:1 | 200 | 360 | 100 | 99.18 |
| Catalyst 11 | 2, 270, 4, 68:1, 30000 | 2.2:1 | 200 | 160 | 100 | 99.35 |
| Catalyst B1 | 2, 270, 4, 68:1, 30000 | 2.2:1 | 200 | 160 | 75.24 | 83.51 |
| Catalyst B2 | 2, 280, 3, 65:1, 30000 | 3:1 | 250 | 120 | 77.68 | 87.58 |
| Catalyst B3 | 3, 256, 3, 75:1, 40000 | 1.5:1 | 300 | 500 | 74.25 | 79.56 |
| Catalyst B4 | 1, 260, 2, 66:1, 20000 | 2.5:1 | 200 | 160 | 73.69 | 87.55 |
| Catalyst B5 | 2, 270, 4, 68:1, 30000 | 2.2:1 | 200 | 160 | 83.45 | 91.34 |
| Catalyst B6 | 2, 280, 3, 65:1, 30000 | 2.1:1 | 220 | 160 | 81.17 | 92.37 |
| Catalyst B7 | 1, 250, 1, 50:1, 20000 | 3:1 | 150 | 260 | 75.38 | 87.26 |
| Catalyst B8 | 2, 280, 3, 65:1, 30000 | 2:1 | 220 | 160 | 87.56 | 82.01 |
| Catalyst B9 | 2, 270, 4, 68:1, 30000 | 2.2:1 | 200 | 160 | 85.25 | 85.32 |
| Catalyst B10 | 2, 300, 3, 65:1, 30000 | 1.8:1 | 220 | 160 | 80.25 | 81.64 |
| Catalyst B11 | 1.2, 280, 3, 65:1, 30000 | 2.5:1 | 220 | 160 | 81.24 | 83.26 |
| Catalyst B12 | 0.5, 280, 3, 75:1, 30000 | 2.1:1 | 220 | 160 | 83.67 | 80.28 |

Note:
Except for ammonia used in Examples 4, 6, and 9, hydrogen was used in other examples/comparative examples; except for trichlorotrifluoroethane used for chlorofluoroethane, dichlorodifluoroethane was used in other examples/comparative examples.

Example 13

The preparation of chlorotrifluoroethylene in this example was the same as the preparation process of Catalyst 1 in Example 12, except that there was no catalyst pretreatment process before the catalytic reaction. The result shows that the conversion rate was 78.67%, and the selectivity was 83.25%.

Example 14

A lifetime test was performed for the application of Catalyst 1 in Example 12. The result showed that, after 1,000 hours, the conversion rate was 99.67% and the selectivity was 96.25%.

Example 15

Under the catalyst stability test conditions in the Chinese patent CN105457651A (catalyst packing of 10 g, reaction temperature of 210° C., atmospheric pressure, air speed of 200h$^{-1}$, the volume ratio of hydrogen to trichlorotrifluoroethane of 2:1), the catalyst 5 was used for the catalyst stability test in this example. The results showed that, the conversion rate of this example was still 99.48% and the selectivity was 98.14% in 2,000 hours, which was higher than the results published in the patent CN105457651A. The conversion rate and the selectivity of this example were higher than the results published in the patent CN105457651A by about 2.3% and about 1.4% respectively in 3,000 hours.

Example 16

A lifetime test was performed for the application of Catalyst B8 in Example 12. The result showed that, after 1,000 hours, the conversion rate was 59.35% and the selectivity was 76.65%.

Example 17

This example was an application of the nitrogen-phosphorus-modified granular carbon-supported bimetallic catalyst in the preparation of 1,1,1,4,4,4-hexafluoro-2-butene by the catalytic hydrogenation and dehydrochlorination of 2,3-dichloro-1,1,1,4,4,4-hexafluoro-2-butene.

5 g Catalyst 1 (diameter of 0.1 cm, length of 0.5 cm) was fed into a fixed bed reactor with an inner diameter of 80 mm. Then, the temperature was increased from room temperature to 300° C. at a heating rate of 0.5° C./min, and the temperature was kept constant for 5 hours. The gas was a mixture of hydrogen and dichlorodifluoroethane with a molar ratio of 100:1, and air speed of 30000 h$^{-1}$. Finally, the temperature was cooled to 220° C.

A mixture of hydrogen and 2,3-dichloro-1,1,1,4,4,4-hexafluoro-2-butene with a molar ratio of 1.5:1 was introduced, the air speed was 250 h$^{-1}$, and the reaction temperature was 250° C. The hydrogenated product was subjected to gas chromatography by Agilent 7890A GC system. The results showed that the conversion rate was 98.54% and the selectivity of 1,1,1,4,4,4-hexafluoro-2-butene was 96.64%.

The catalysts of Examples 2 to 11 and Comparative Examples 1 to 12 were respectively used for preparing 1,1,1,4,4,4-hexafluoro-2-butene from 2,3-dichloro-1,1,1,4,4,4-hexafluoro-2-butene. The pretreatment conditions and reaction conditions of the catalyst were adjusted, and the influence of catalysts with different proportions of alloy phase particles on the reaction conversion rate and selectivity was investigated. Details were shown in Table 2 below.

Example 20

A lifetime test was performed for the application of Catalyst B10 in Example 17. The result showed that, after 800 hours, the conversion rate was 55.75% and the selectivity was 60.25%.

Example 21

This example was an application of the nitrogen-phosphorus-modified granular carbon-supported bimetallic catalyst in the preparation of trichloromethane by the catalytic hydrogenation and dehydrochlorination of carbon tetrachloride.

TABLE 2

Results of catalyzing 2,3-dichloro-1,1,1,4,4,4-hexafluoro-2-butene reaction

| | | Reaction conditions | | | | |
|---|---|---|---|---|---|---|
| Catalyst | Pretreatment conditions of catalyst Heating rate ° C./min; final temperature ° C.; time of constant temperature h; molar ratio of hydrogen to dichlorodifluoroethane; air speed h$^{-1}$ | Molar ratio of hydrogen to 2,3-dichloro-1,1,1,4,4,4-hexafluoro-2-butene | Temperature ° C. | air speed h$^{-1}$ | Conversion rate % | Selectivity % |
| Catalyst 1 | 0.5, 300, 5, 100:1, 30000 | 1.5:1 | 220 | 280 | 98.54 | 96.64 |
| Catalyst 2 | 0.5, 3000, 1, 50:1, 10000 | 2:1 | 220 | 360 | 98.35 | 95.25 |
| Catalyst 3 | 3, 300, 4, 80:1, 40000 | 3:1 | 240 | 460 | 99.35 | 96.65 |
| Catalyst 4 | 3.5, 380, 3, 50:1, 30000 | 1.5:1 | 150 | 120 | 98.36 | 95.19 |
| Catalyst 5 | 1, 400, 2, 66:1, 20000 | 2.1:1 | 300 | 560 | 99.88 | 96.25 |
| Catalyst 6 | 2, 3000, 4, 68:1, 30000 | 1.2:1 | 280 | 260 | 98.36 | 97.18 |
| Catalyst 7 | 3, 345, 3, 75:1, 40000 | 1.5:1 | 350 | 500 | 99.58 | 96.29 |
| Catalyst 8 | 2, 350, 3, 65:1, 30000 | 1.5:1 | 230 | 400 | 98.25 | 96.38 |
| Catalyst 9 | 1, 375, 5, 66:1, 20000 | 2.5:1 | 250 | 600 | 98.78 | 95.81 |
| Catalyst 10 | 1, 380, 2, 66:1, 20000 | 1.8:1 | 200 | 360 | 98.10 | 95.18 |
| Catalyst 11 | 2, 400, 4, 68:1, 30000 | 2.2:1 | 200 | 160 | 99.45 | 96.38 |
| Catalyst 8 | 3, 300, 3, 75:1, 40000 | 2:1 | 180 | 260 | 99.56 | 95.88 |
| Catalyst B1 | 3, 300, 3, 75:1, 40000 | 2:1 | 180 | 260 | 75.18 | 71.36 |
| Catalyst B2 | 0.5, 300, 5, 100:1, 30000 | 1.5:1 | 220 | 480 | 78.34 | 73.14 |
| Catalyst B3 | 1, 400, 2, 66:1, 20000 | 2:1 | 300 | 560 | 76.78 | 71.55 |
| Catalyst B4 | 2, 3000, 4, 68:1, 30000 | 2:1 | 280 | 560 | 81.01 | 73.15 |
| Catalyst B5 | 2, 3000, 4, 68:1, 30000 | 2:1 | 280 | 460 | 80.75 | 75.29 |
| Catalyst B6 | 1, 375, 5, 66:1, 20000 | 2.5:1 | 200 | 560 | 82.34 | 68.24 |
| Catalyst B7 | 3, 300, 3, 75:1, 40000 | 2:1 | 180 | 360 | 78.28 | 71.15 |
| Catalyst B8 | 2, 350, 3, 65:1, 30000 | 3:1 | 280 | 500 | 74.25 | 68.26 |
| Catalyst B9 | 3, 300, 3, 75:1, 40000 | 2:1 | 180 | 260 | 84.67 | 74.86 |
| Catalyst B10 | 1, 380, 2, 66:1, 20000 | 2:1 | 350 | 600 | 73.68 | 76.18 |
| Catalyst B11 | 2, 400, 4, 68:1, 30000 | 2:1 | 300 | 560 | 71.69 | 71.89 |
| Catalyst B12 | 3, 300, 3, 75:1, 40000 | 2.5:1 | 300 | 560 | 74.56 | 74.28 |

Example 18

The preparation of 1,1,1,4,4,4-hexafluoro-2-butene in this example was the same as the preparation process of Catalyst 3 in Example 17, except that there was no catalyst pretreatment process before the catalytic reaction in this example. The result shows that the conversion rate was 75.68%, and the selectivity was 70.05%.

Example 19

A lifetime test was performed for the application of Catalyst 4 in Example 17. The result showed that, after 800 hours, the conversion rate was 98.22% and the selectivity was 95.35%.

5 g Catalyst 1 (diameter of 0.1 cm, length of 0.2 cm) was fed into a fixed bed reactor with an inner diameter of 35 mm. Then, the temperature was increased from room temperature to 280° C. at a heating rate of 2° C./min, and the temperature was kept constant for 3 hours. The gas was a mixture of hydrogen and chlorofluoroethane (for example, dichlorodifluoroethane, trichlorotrifluoroethane) with a molar ratio of 70:1, and air speed of 25000 h$^{-1}$. Finally, the temperature was cooled to 150° C. A mixture of hydrogen, carbon tetrachloride and nitrogen with a molar ratio of 1:2.1:3 was introduced, the air speed was 1500 h$^{-1}$, and the reaction temperature was 150° C. The hydrogenated product was subjected to gas chromatography by Agilent 7890A GC system. The results showed that the conversion rate was 99.85% and the selectivity of trichloromethane was 95.58%.

The catalysts of Examples 2 to 11 and Comparative Examples 1 to 12 were respectively used for preparing trichloromethane from carbon tetrachloride. The pretreatment conditions and reaction conditions of the catalyst were adjusted, and the influence of catalysts with different proportions of alloy phase particles on the reaction conversion rate and selectivity was investigated. Details were shown in Table 3 below.

TABLE 3

Results of catalyzing carbon tetrachloride reaction

| Catalyst | Pretreatment conditions of catalyst Heating rate ° C./min; final temperature ° C.; Time of constant temperature h; molar ratio of hydrogen to chlorofluoroethane; air speed $h^{-1}$ | Reaction conditions | | | | |
| --- | --- | --- | --- | --- | --- | --- |
| | | Molar ratio of hydrogen to carbon tetrachloride to nitrogen | Temperature ° C. | air speed $h^{-1}$ | Conversion rate % | Selectivity % |
| Catalyst 1 | 2, 280, 3, 60:1, 25000 | 1:2:3 | 150 | 1500 | 99.65 | 95.53 |
| Catalyst 2 | 0.5, 3000, 1, 50:1, 10000 | 1:2:5 | 90 | 1500 | 99.15 | 95.26 |
| Catalyst 3 | 3, 300, 4, 80:1, 40000 | 1:2:6 | 80 | 2000 | 99.25 | 95.48 |
| Catalyst 4 | 3.5, 380, 3, 50:1, 30000 | 1:2:7 | 85 | 1000 | 98.46 | 95.84 |
| Catalyst 5 | 1, 400, 2, 66:1(trichlorotrifluoroethane), 20000 | 1:2:8 | 95 | 1500 | 99.38 | 95.64 |
| Catalyst 6 | 2, 3000, 4, 68:1, 30000 | 1:2:10 | 100 | 1500 | 98.85 | 95.15 |
| Catalyst 7 | 3, 345, 3, 75:1, 40000 | 1:2:10 | 120 | 2000 | 97.88 | 96.84 |
| Catalyst 8 | 2, 350, 3, 65:1, 30000 | 1:2:10 | 150 | 1000 | 98.59 | 97.75 |
| Catalyst 9 | 1, 375, 5, 66:1, 20000 | 1:2:10 | 120 | 1500 | 99.65 | 95.82 |
| Catalyst 10 | 1, 380, 2, 86:1, 20000 | 1:2:15 | 95 | 1500 | 99.48 | 96.18 |
| Catalyst 11 | 2, 400, 4, 68:1, 30000 | 1:2:15 | 100 | 2000 | 99.64 | 96.36 |
| Catalyst B1 | 2, 400, 4, 68:1, 30000 | 1:2:15 | 100 | 2000 | 82.38 | 85.46 |
| Catalyst B2 | 3, 300, 4, 80:1, 40000 | 1:2:15 | 150 | 1500 | 79.17 | 84.64 |
| Catalyst B3 | 1, 400, 2, 66:1, 20000 | 1:2:15 | 120 | 1500 | 78.75 | 82.75 |
| Catalyst B4 | 2, 3000, 4, 68:1, 30000 | 1:2:15 | 95 | 2000 | 82.52 | 78.45 |
| Catalyst B5 | 2, 3000, 4, 68:1, 30000 | 1:2:15 | 100 | 1000 | 83.71 | 78.39 |
| Catalyst B6 | 1, 375, 5, 66:1, 20000 | 1:2:15 | 120 | 1500 | 81.33 | 68.83 |
| Catalyst B7 | 3, 300, 3, 75:1, 40000 | 1:2:15 | 150 | 1500 | 78.24 | 78.12 |
| Catalyst B8 | 2, 350, 3, 65:1, 30000 | 1:2:15 | 120 | 2000 | 75.27 | 67.86 |
| Catalyst B9 | 2, 400, 4, 68:1, 30000 | 1:2:15 | 100 | 2000 | 88.96 | 89.75 |
| Catalyst B10 | 1, 380, 2, 66:1, 20000 | 1:2:15 | 100 | 1500 | 78.67 | 75.88 |
| Catalyst B11 | 2, 400, 4, 68:1, 30000 | 1:2:15 | 120 | 1500 | 75.62 | 72.89 |
| Catalyst B12 | 3, 300, 3, 75:1, 40000 | 1:2:15 | 150 | 1500 | 76.62 | 73.88 |

Note:
Except for trichlorotrifluoroethane used for chlorofluoroethane in Example 5, dichlorodifluoroethane was used in other examples/comparative examples.

Example 22

The preparation of trichloromethane in this example was the same as the application of Catalyst 3 in Example 21, except that there was no catalyst pretreatment process before the catalytic reaction. The result shows that the conversion rate was 72.78%, and the selectivity was 78.35%.

Example 23

A lifetime test was performed for the application of Catalyst 8 in Example 21. The result showed that, after 1,000 hours, the conversion rate was 98.57% and the selectivity was 95.75%.

Example 24

A lifetime test was performed for the application of Catalyst B5 in Example 21. The result showed that, after 800 hours, the conversion rate was 55.15% and the selectivity was 69.65%.

The invention claimed is:

1. A nitrogen-phosphorus-modified granular carbon-supported bimetallic catalyst, wherein the catalyst comprises a nitrogen-phosphorus-modified carbon carrier and metal particles supported on the carbon carrier, and the metal particles include first metal elementary substance particles, second metal elementary substance particles and bimetallic alloy phase particles, the percentage of the bimetallic alloy phase particles in the metal particles is ≥80%, and at least 90% of the alloy phase particles have a size of 1 nm to 20 nm.

2. The granular carbon-supported bimetallic catalyst according to claim 1, wherein the percentage of the bimetallic alloy phase particles in the metal particles is 85-95%, and at least 95% of the alloy phase particles have a size of 2 nm to 10 nm.

3. The granular carbon-supported bimetallic catalyst according to claim 1, wherein the nitrogen content in the carbon carrier is 0.5-10 wt %, and the phosphorus content in the carbon carrier is 0.1-5.0 wt %.

4. The granular carbon-supported bimetallic catalyst according to claim 1, wherein the carbon carrier is coconut shell or wooden activated carbon, the specific surface area of the carbon carrier is ≥800 m²/g, the metal ash content is ≤3.0 wt %, and the mesopore ratio is ≥50%.

5. The granular carbon-supported bimetallic catalyst according to claim 4, wherein the carbon carrier is a cylindrical particle with a particle diameter of 0.1-0.5 cm and a length of 0.1-5 cm.

6. The granular carbon-supported bimetallic catalyst according to claim 1, wherein a first metal is at least one of palladium, platinum or ruthenium, with a loading content of 0.01-4.0%; a second metal is copper, zinc and/or tin, with a loading content of 0.01-10.0%; and the mass ratio of the first metal to the second metal is (0.01-5): 1.

7. A method for preparing the granular carbon-supported bimetallic catalyst according to claim 1, wherein the granular carbon-supported bimetallic catalyst is prepared by the following steps:
- A1. preparing nitrogen-phosphorus co-doped carbon particles;
- A2. loading the nitrogen-phosphorus co-doped carbon particles onto the carbon carrier;
- A3. loading the second metal onto the carbon carrier by using nitrogen-phosphorus co-doped carbon particles as a first anchor point under the irradiation with an ultraviolet lamp;
- A4. loading the first metal on the carbon carrier.

8. The method for preparing the granular carbon-supported bimetallic catalyst according to claim 7, wherein in the step A3, the irradiation is performed with a 200-500 w ultraviolet lamp once to three times, 3-10 min each time.

9. The method for preparing the granular carbon-supported bimetallic catalyst according to claim 7, wherein the carbon particles have a size of 1 nm to 20 nm.

10. The method for preparing the granular carbon-supported bimetallic catalyst according to claim 7, wherein the step A3 further comprises:
- pyrolyzing carbon particles at a temperature of 120-300° C. in a hydrogen atmosphere after the second metal is loaded onto the carbon carrier, the binding sites of nitrogen and phosphorus elements, the carbon carrier and the second metal form a second anchor point for loading the first metal onto the carbon carrier.

11. The method for preparing the granular carbon-supported bimetallic catalyst according to claim 7, wherein in the step A3, the irradiation is performed with a 200-500 w ultraviolet lamp twice with wavelengths of 280-320 nm and 200-280 nm respectively.

12. The granular carbon-supported bimetallic catalyst of claim 1, wherein the granular carbon-supported bimetallic catalyst is used for hydrodechlorination of C1-C5 chlorofluoro alkanes in a fixed bed, the conversion rate of C1-C5 chlorofluoro alkanes is at least about 98% and the product selectivity is at least about 95%.

13. The granular carbon-supported bimetallic catalyst according to claim 12, wherein the granular carbon-supported bimetallic catalyst is used for preparing difluoromethane from difluorodichloromethane, chlorotrifluoroethylene from trichlorotrifluoroethane, 1,1,1,4,4,4-hexafluoro-2-butene from 2,3-dichloro-1,1,1,4,4,4-hexafluoro-2-butene, pentafluoroethane from chloropentafluoroethane or trichloromethane from carbon tetrachloride.

14. A method for preparing chlorotrifluoroethylene, comprising contacting trifluorotrichloroethane with the granular carbon-supported bimetallic catalyst of claim 1, wherein the conversion rate of trichlorotrifluoroethane is at least about 98%, the selectivity of chlorotrifluoroethylene is at least about 95%, and the product contains at least less than about 1% of chlorotrifluoroethane.

15. The method for preparing chlorotrifluoroethylene according to claim 14, wherein the method comprises the following steps:
- B1. feeding the granular carbon-supported bimetallic catalyst into a fixed-bed reactor, introducing a mixture of ammonia and chlorofluoroethane, wherein the molar ratio of ammonia to chlorofluoroethane is (50-100): 1, the air speed is 10,000-50,000 $h^{-1}$, heating to 300-400° C. at a rate of 0.5-3.5° C./min, keeping for 1-5 hours and then cooling to the reaction temperature;
- B2. introducing a mixture composed of hydrogen and trichlorotrifluoroethane, wherein the molar ratio of $H_2$ to trichlorotrifluoroethane is (1.5-4.0): 1, the air speed is 120-500 $h^{-1}$ and the reaction temperature is 150-300° C.

16. A method for preparing 1,1,1,4,4,4-hexafluoro-2-butene, comprising contacting 2,3-dichloro-1,1,1,4,4,4-hexafluoro-2-butene with the granular carbon-supported bimetallic catalyst of claim 1, wherein the conversion rate of 2,3-dichloro-1,1,1,4,4,4-hexafluoro-2-butene is at least about 98%, the selectivity of 1,1,1,4,4,4-hexafluoro-2-butene is at least about 95%, and the product contains at least less than about 1% of 2-chloro-1,1,1,4,4,4-hexafluoro-2-butene.

17. The method for preparing 1,1,1,4,4,4-hexafluoro-2-butene according to claim 16, comprising:
- C1. feeding the granular carbon-supported bimetallic catalyst into a fixed-bed reactor, introducing a mixture of hydrogen and dichlorodifluoroethane, wherein the molar ratio of $H_2$ to dichlorodifluoroethane is (50-100): 1, the air speed is 10,000-50,000 $h^{-1}$, heating to 300-400° C. at a rate of 0.5-3.5° C./min, keeping for 1-5 hours and then cooling to the reaction temperature;
- C2. introducing a mixture composed of hydrogen and 2,3-dichloro-1,1,1,4,4,4-hexafluoro-2-butene, wherein the molar ratio of $H_2$ to 2,3-dichloro-1,1,1,4,4,4-hexafluoro-2-butene is (1.5-4.0): 1, the air speed is 120-600 $h^{-1}$ and the reaction temperature is 150-350° C.

* * * * *